United States Patent [19]

Friederichs et al.

[11] 4,035,099

[45] July 12, 1977

[54] DRILL BIT LOCATING TOOL

[75] Inventors: Paul Friederichs, Vilkerath; Theodor Vitt, Porz-Eil, both of Germany

[73] Assignee: Prameta prazisionsmetall- und Kunststofferzeungnisse G. Baumann & Co., Germany

[21] Appl. No.: 665,319

[22] Filed: Mar. 9, 1976

[30] Foreign Application Priority Data

Mar. 14, 1975 Germany .................. 7508094[U]

[51] Int. Cl.² ........................................ B23B 49/00
[52] U.S. Cl. .............................. 408/103; 33/189; 144/27
[58] Field of Search ............ 408/103, 97, 108, 109; 144/27; 33/189

[56] References Cited

U.S. PATENT DOCUMENTS 3,046,818  7/1962  Saha ................................ 408/103
3,790,295  2/1974  Grunert ........................... 408/103

Primary Examiner—Othell M. Simpson
Assistant Examiner—Z. R. Bilinsky
Attorney, Agent, or Firm—Diller, Brown, Ramik & Wight

[57]  ABSTRACT

This invention relates to a drill bit locating tool particularly adapted for locating drill holes associated with furniture hinges, the tool including a generally U-shaped member defined by a bight portion and a pair of the legs with a first of the legs carrying a clamp and a second of the legs having aperture means for locating drill bits to form drill holes for an associated furniture hinge, the improvement comprising an adaptor carried by the second leg, the adaptor being generally U-shaped in cross-section and in embracing relationship to the second leg, and means carried by the adaptor for locating the tool relative to a piece of furniture.

12 Claims, 6 Drawing Figures

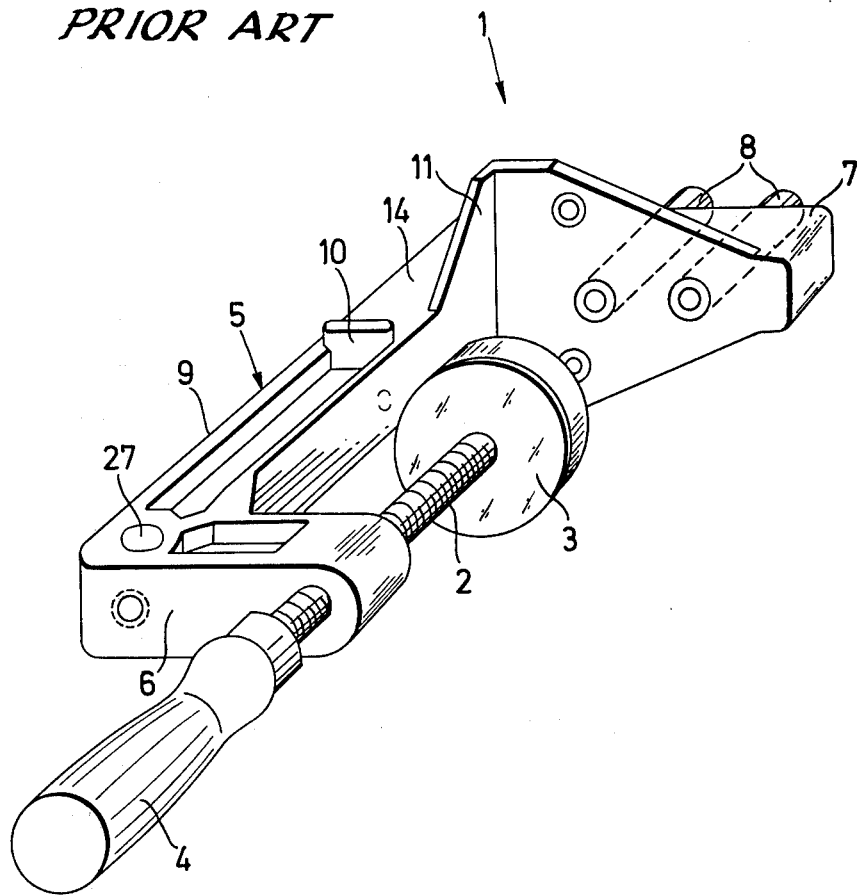

DRILL BIT LOCATING TOOL

The present invention is directed to a tool for locating drill bits and thus accurately locate drill holes relative to portions of furniture as, for example, a furniture frame and a door or leaf so that the utilization of a hinge accurately joins the door to the furniture frame.

A locating tool of the type to which this invention is directed is disclosed in U.S. Pat. No. 3,790,295 in the name of Hellmuth Grunert issued Feb. 5, 1974 and entitled "Boring Device for Securing Hinges and the Like." The present invention constitutes an improvement over the latter-identified patent. In the latter-mentioned patent, the locating tool includes a pair of legs joined by a bight portion with a first of the legs carrying a screw clamp and the remaining or second of the legs having bushings for locating drill bits to make accurate holes for appropriate furniture hinges to unite, for example, a door or leaf to a furniture frame.

In accordance with this invention, such known drill bit locating tools are improved by the provision of an adaptor carried by the second leg such that with the same locating tool but different adaptors, it is possible to drill holes for a variety of different hinges.

In further accordance with this invention, the adaptor is provided with novel means for clamping the same to the second leg of the drill bit locating tool and the adaptor preferably includes means for locating the tool relative to a piece or pieces of furniture.

A further object of this invention is to provide a novel drill bit locating tool particularly adapted for locating drill holes associated with furniture hinges in the manner earlier described with the adaptor being provided with at least one additional aperture means for receiving a drill bit thus locating at least one additional drill hole beyond drill holes located by aperture means of the second arm of the tool.

Yet another object of this invention is to provide a novel drill bit locating tool which in conjunction with the adaptor may be readily employed to achieve accurate alignment between a furniture frame and an associated door leaf, the adaptor further including recess means which clear a portion of the second arm of the locating tool for the receipt of appropriate guide bars.

With the above and other objects in view that will hereinafter appear, the nature of the invention will be more clearly understood by reference to the following detailed description, the appended claimed subject matter, and the several views illustrated in the accompanying drawings.

In the Drawings:

FIG. 1 is a perspective view of a novel drill bit locating tool constructed in accordance with this invention, and illustrates a first arm carrying a screw clamp, a second arm opposing the first arm, and bushings in the second arm for locating drill bits.

Figures 2, 4, 5:
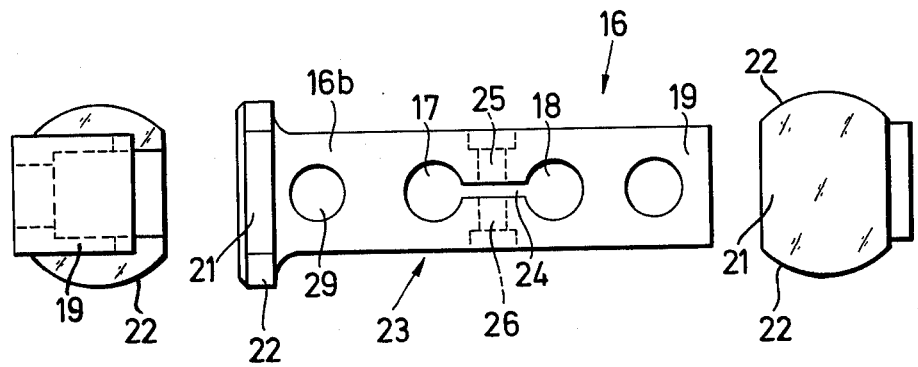
FIG. 2 is a top plan view of an adaptor associated with the second arm of the tool, and illustrates means for clamping the adaptor to the second arm of the tool and aperture means in the adaptor for locating drill holes by the receipt therein of drill bits.
FIG. 4 is an end view of the adaptor looking from left-to-right in FIG. 2, and illustrates curved surfaces of the adaptor for locating the same within a cylindrical bore of an associated leaf, door or like piece of furniture.
FIG. 5 is an end view of the adaptor looking from right-to-left in FIG. 2, and illustrates an additional aperture in the adaptor for locating a drill bit.
Figure 3:
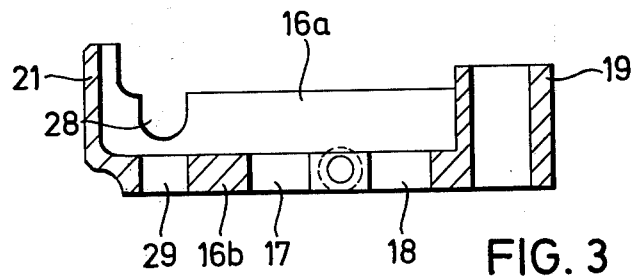
FIG. 3 is a longitudinal sectional view of the adaptor of FIG. 2, and illustrates further details thereof.

A novel drill bit locating tool is generally designated by the reference numeral 1 (FIG. 1) and includes a threaded post or spindle 2 carrying a clamping plate 3 and having at an opposite end thereof a handle 4. The screw 12 is threaded into a threaded bore (unnumbered) of a first leg 6 of the tool 1 which is opposed to a second leg 7. The legs 6, 7 are joined to each other by an integral bight portion 5. Aperture means (unnumbered) provided in the second leg 7 receive bushings 8 adapted to receive a drill bit to form or locate drill holes associated with furniture hinges.

An end portion 14 of the bight portion 5 includes a pair of stops 10, 11 which function in the manner fully disclosed in the latter-identified patent. Essentially, the stop 11 is designed to abut against a leaf or door of furniture while the stop 11 serves as a point of location for a frame or like piece of furniture. Reference is again made specifically to the latter-mentioned patent, and specifically FIG. 8 thereof, for the manner in which the stops 10, 11 are associated with respective furniture frames and doors or leafs. A surface 9 of the bight portion 5 is relatively flat and may be used as further locating means in the manner described in the latter-noted patent when the tool 1 is associated with a leaf or door having an elongated notch or recess.

An aperture 27 passes through the bight portion 5 generally at its intersection with the first leg 6. The aperture 27 is designed to receive therethrough in sliding relationship, a guide bar or further mounting elements, such as screws (not shown).

Figure 6:
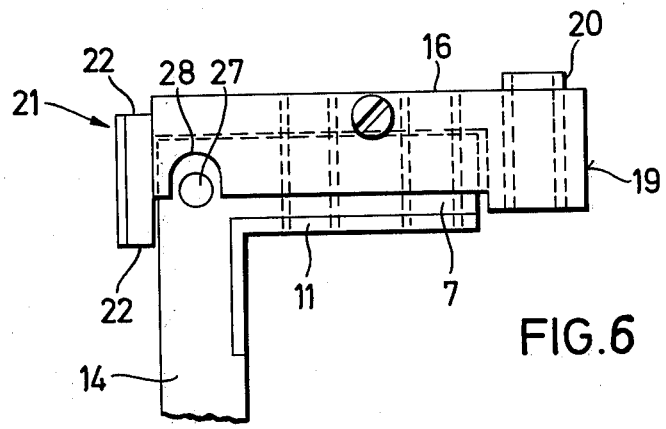
FIG. 6 is a fragmentary side elevational view of a portion of the locating tool and illustrates the adaptor clamped thereto.

A like aperture 27 is also provided at the intersection of the bight portion 5 and the second leg 7, as is best illustrated in FIG. 6.

An adaptor associated with the locating tool is shown best in FIGS. 2 through 6 of the drawings and is of a generally U-shaped cross-sectional configuration defined by a pair of legs 16a, 16a and a bight portion 16b. The bight portion 16b may have a number of apertures 17, 18 which telescopically receive the bushings 8, 8 of the second leg 7 in the manner most apparent in FIG. 6. Additional apertures 19, 29 may be provided for receiving drill bits to locate drill holes for appropriate furniture hinges. The aperture means 29 may also receive a screw by which a member may be attached to the end portion 14 of the tool 1.

The walls or legs 16a, 16a are recessed or notched as at 28 (FIGS 3 and 6) to provide clearance for the aperture 27 at the junction of the leg 7 and the bight portion 5. A terminal end 21 of the adaptor 16 includes a pair of curved surfaces 22, 2 (FIG. 4) which are recessed in a cylindrical bore of a door to locate the same relative to the tool 1 and an associated piece of furniture clamped between the pad 3 and the second arm 7 as is more fully illustrated and described in the latter-noted patent.

The apertures 17, 18 are also joined by a slot 24. Clamping means generally designated by the reference numeral 23 includes a socket screw 25 into which is threaded a set screw 26 with the latter screws having axes generally normal to the slot 24. Thus, as the screws are tightened the walls or legs 16a, 16a flex toward each other and grasp the second leg 7 in a manner readily apparent from FIG. 6. In this manner, the adaptor 16 can be removably secured to the leg 7 but can be readily removed therefrom such that the tool 1 can be utilized without the use of the adaptor or alternatively, another adaptor may be clamped thereto.

The end portion or aperture 19 may also receive a bushing 20 for guiding an associated drill bit.

While preferred forms and arrangements of parts have been shown in illustrating the invention, it is to be clearly understood that various changes in details and arrangements of parts may be made without departing from the scope and spirit of this disclosure.

We claim:

1. A drill bit locating tool particularly adapted for locating drill holes associated with furniture hinges comprising a generally U-shaped member defined by a bight portion and a pair of legs, a first of said legs carrying means movable toward a second of said legs for clamping therebetween a portion of furniture which is to be drilled to form holes for fasteners to secure a hinge to the furniture portion, said second leg having a pair of apertured bushings for locating drill bits to form drill holes for an associated furniture hinge, an adaptor carried by said second leg, said adaptor being generally U-shaped in cross-section defined by a bight portion and a pair of legs, said adaptor being in embracing relationship to said second leg, and a pair of apertures in the bight portion of said adaptor for telescopically receiving said pair of bushings thereby locating said tool relative to a piece of furniture.

2. The tool as defined in claim 1 wherein said adaptor includes at least one aperture means for locating a drill bit to form a drill hole for an associated hinge.

3. The tool as defined in claim 2 including means for releasably clamping said adaptor to said second leg.

4. The tool as defined in claim 2 including means for releasably clamping said adaptor to said second leg, said clamping means including a slot in said bight portion of said adaptor, and screw means traversing said slot which when tightened flex said adaptor into intimate embracing relationship with said second leg.

5. The tool as defined in claim 1 including locating means in the form of at least one curved surface for engaging against a like curved surface of a bore associated with a piece of furniture.

6. The tool as defined in claim 5 including means for releasably clamping said adaptor to said second leg.

7. The tool as defined in claim 1 wherein said adaptor includes at least one aperture means for locating a drill bit to form a drill hole for an associated furniture hinge, and said at least one aperture means is in generally parallelism with axes of said pair of apertured bushings for cooperatively locating a drill bit to form a drill hole for an associated furniture hinge.

8. The tool as defined in claim 5 including means for releasably clamping said adaptor to said second leg, said clamping means including a slot in said bight portion said adaptor, and screw means traversing said slot which when tightened flex said adaptor into intimate embracing relationship with said second leg.

9. The tool as defined in claim 1 including means for releasably clamping said adaptor to said second leg.

10. The tool as defined in claim 1 including means for releasably clamping said adaptor to said second leg, said clamping means including a slot in said bight portion of said adaptor, and screw means traversing said slot which when tightened flex said adaptor into intimate embracing relationship with said second leg.

11. The tool as defined in claim 10 including recess means in at least one of said last-mentioned legs for permitting access to a portion of said second leg for securement to the latter of a further mounting element.

12. The tool as defined in claim 1 including recess means in at least one of said adaptor legs for permitting access to a portion of said second leg for securement to the latter of a further mounting element.

* * * * *